United States Patent [19]

Zarate et al.

[11] Patent Number: 4,957,523
[45] Date of Patent: Sep. 18, 1990

[54] HIGH SPEED PRESSURE SWING ADSORPTION LIQUID OXYGEN/LIQUID NITROGEN GENERATING PLANT

[75] Inventors: Robert A. Zarate, Ontario; Richard E. Self, Los Alamitos; Lee W. Smith, El Toro, all of Calif.

[73] Assignee: Pacific Consolidated Industries, Orange, Calif.

[21] Appl. No.: 425,363

[22] Filed: Oct. 19, 1989

Related U.S. Application Data

[63] Continuation of Ser. No. 302,822, Jan. 27, 1989, abandoned.

[51] Int. Cl.⁵ .............................................. F25J 5/00
[52] U.S. Cl. ........................................ 62/13; 62/18; 62/24; 62/44
[58] Field of Search .................... 62/13, 11, 18, 23, 24, 62/38, 44

[56] References Cited

U.S. PATENT DOCUMENTS

| | | | |
|---|---|---|---|
| 3,756,035 | 9/1973 | Yearout | 62/24 |
| 3,947,259 | 3/1976 | Frischbier | 62/38 |
| 4,137,056 | 1/1979 | Golovko | 62/13 |
| 4,254,629 | 3/1981 | Olslensky | 62/38 |
| 4,356,013 | 10/1982 | Linde et al. | 62/38 |
| 4,617,037 | 10/1986 | Okada et al. | 62/38 |
| 4,704,148 | 11/1987 | Kleinberg | 62/24 |
| 4,746,343 | 5/1988 | Ishizu et al. | 62/18 |

OTHER PUBLICATIONS

Cryomec Brochure: Jan. 7, 1985.

*Primary Examiner*—Ronald C. Capossela
*Attorney, Agent, or Firm*—Knobbe, Martens, Olson & Bear

[57] ABSTRACT

An apparatus for producing high purity oxygen and nitrogen in the liquid and gaseous phases. The apparatus is a modular, mobile system employing a low design operating pressure. The system purifies ambient air through filters and a dual immobilized fixed bed molecular sieve type pressure swing adsorber prior to the cryogenic distillation of the air. Through the incorporation of the pressure swing adsorber having a high frequency regeneration cycle, the disclosed system provides a reduced system size. The configured system employs waste gas from the distillation process to purge the pressure swing adsorber. The cryogenic distillation procedure includes a heat exchanger, a turboexpander, high and low pressure distillation columns, a subcooler and a condenser.

9 Claims, 9 Drawing Sheets

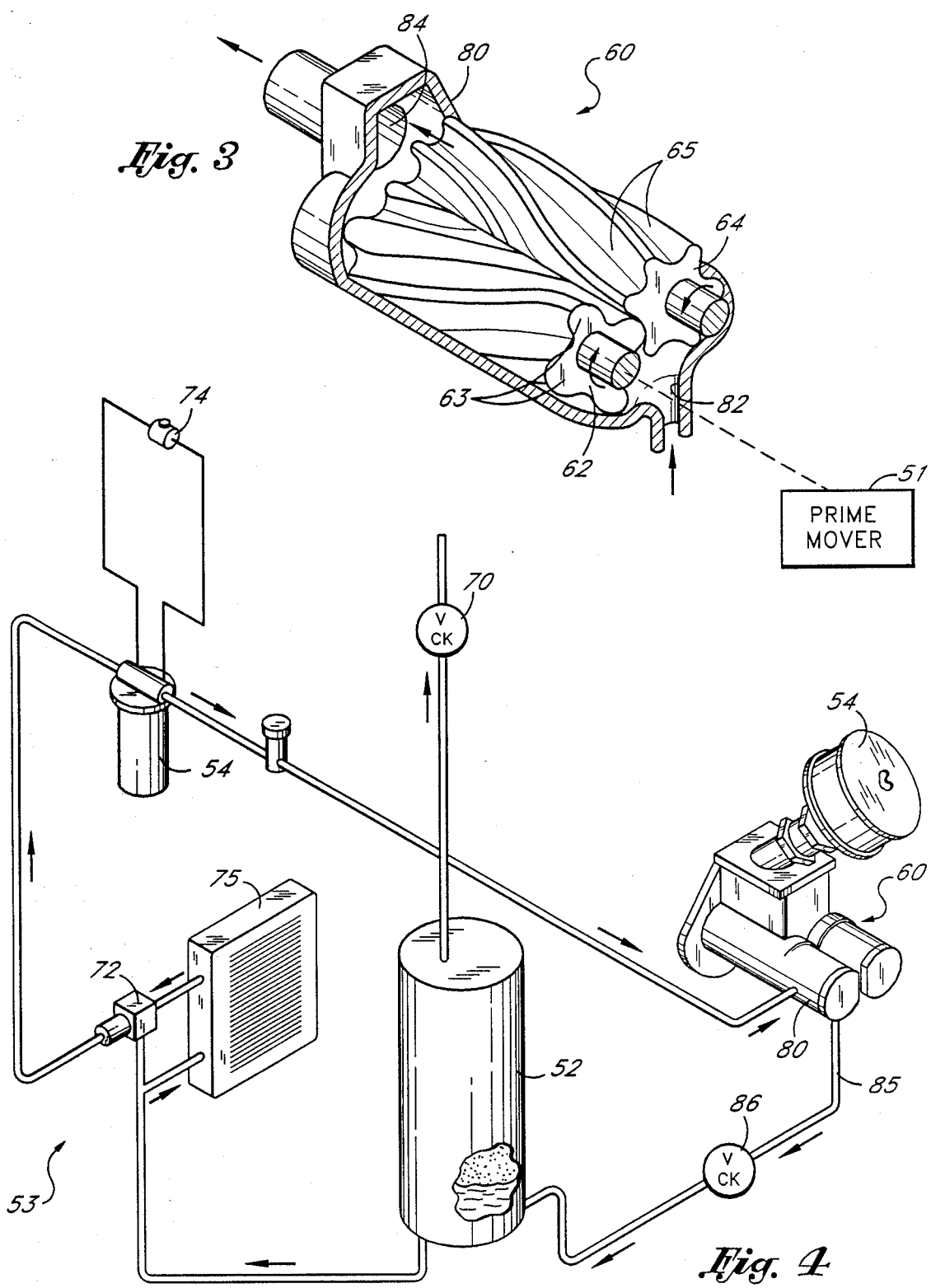

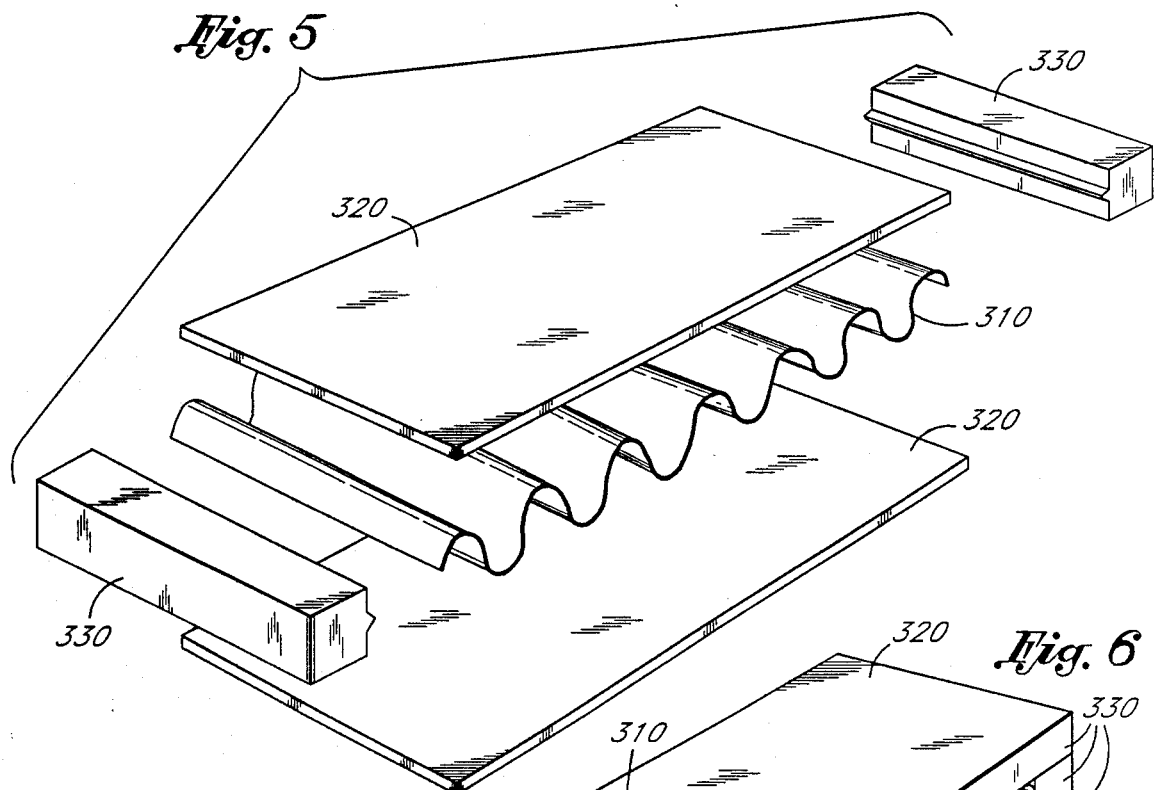
Fig. 5
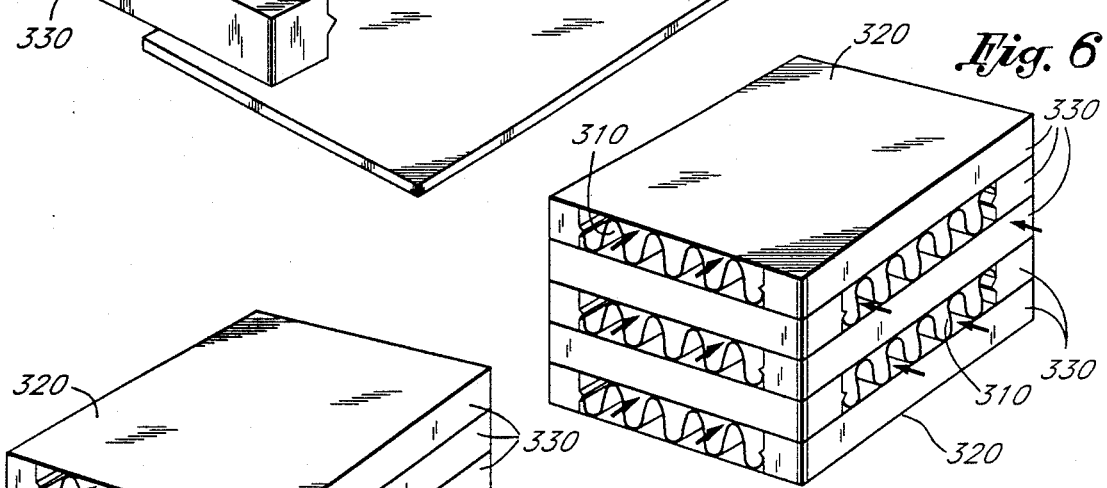
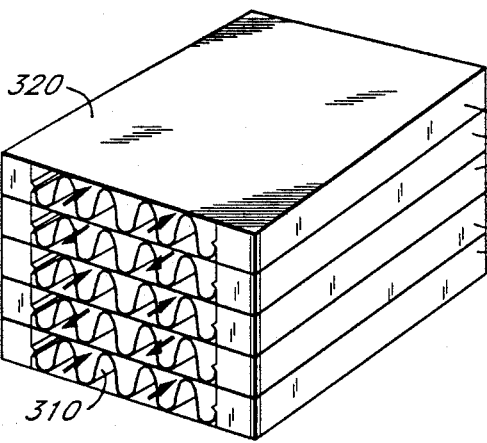
Fig. 7
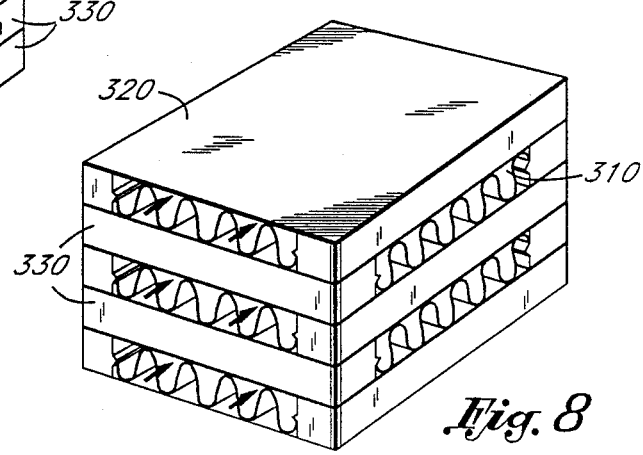
Fig. 6
Fig. 8

HIGH SPEED PRESSURE SWING ADSORPTION LIQUID OXYGEN/LIQUID NITROGEN GENERATING PLANT

This application is a continuation of application Ser. No. 302,822, filed 1/27/89 now abandoned.

BACKGROUND OF THE INVENTION

This invention relates generally to the production of liquid oxygen and nitrogen through cryogenic distillation of air and, in particular, to a compact, modular, mobile system having a low operating pressure.

DESCRIPTION OF THE PRIOR ART

The industrial and commercial uses of nitrogen and oxygen have created tremendous demands for pure oxygen and nitrogen in both liquid and gaseous phases. In addition, a large volume of high purity nitrogen and oxygen is required support. These demands for pure oxygen and nitrogen are met primarily through large-scale stationary production facilities. Unfortunately, these facilities are located a substantial distance from the end user, necessitating the transportation of large quantities of liquid oxygen and nitrogen over substantial distances. As liquid oxygen is highly explosive and both liquid oxygen and liquid nitrogen must be kept under heavy pressure at extremely low temperatures, the transportation process is both dangerous and expensive.

Oxygen and nitrogen of high purity may be obtained through cryogenic distillation of ambient air. To obtain liquid oxygen and nitrogen of high purity, the ambient air must be filtered prior to the distillation process. Previous cryogenic systems have utilized carbon filters and temperature swing adsorption systems for predistillation filtering.

Cryogenic distillation systems, employing carbon filter beds require shut-down periods for the replacement of the filters, and are susceptible to damage by vibration and shock, as would occur if the system were transported. Specifically, vibration causes the packed beds to disassemble and disintegrate. In addition, the carbon beds are subject to frequent fouling from hydrocarbons and sulfur base compounds. As a result, substantial filtering is required before the air stream enters the carbon beds. This additional filtering increases the size and cost of the cryogenic system.

While temperature swing adsorption units in cryogenic distillation systems offer significant advantages over systems employing carbon filter beds, temperature swing adsorption units are also subject to severe limitations. Specifically, temperature swing adsorption units filter the air stream at relatively low temperatures (around 40 degrees Fahrenheit) and must be purged at relatively high temperatures (around 500 degrees Fahrenheit). It typically requires at least 3 hours to change from filtration temperature to regeneration temperature, to complete the regeneration and to change back to process temperature (one regeneration cycle). This 3 hour regeneration cycle permitted substantial penetration of contaminants into the on-line bed, thereby necessitating the use of large volume beds to ensure proper filtration, thereby increasing the size of the system.

Further, in previous cryogenic systems, the filter's bed structure and bed packing often failed as a result of pressure swings caused by the transition from the on-line process status to the regenerative status.

Finally, temperature swing adsorption units cannot properly filter the inlet air unless the inlet air has a low water vapor content. To achieve this low water vapor content, the water vapor must be condensed out of the inlet air by refrigeration units. These refrigeration units require substantial power and further increase the size of the system.

Thus, there is needed a safe, low weight, compact mobile generator of pure liquid oxygen and nitrogen.

SUMMARY OF THE INVENTION

The present invention provides a relatively compact, modular system for the production of high purity oxygen and nitrogen in both the liquid and gaseous phase. One aspect of the invention is a system for producing liquid oxygen and nitrogen having an air compressor assembly, a coalescer/HEPA filter, a pressure swing adsorber, a warm heat exchanger, a main heat exchanger, a turboexpander, a nitrogen column, a condenser, a subcooler and an oxygen column.

Another aspect of the present invention is the use of an ambient air filtration element having a regeneration cycle of less than five minutes and preferably, less than 35 seconds. This is significant in that this relatively short regeneration cycle prevents contaminants from deeply penetrating the bed. As a result, the filtering system can accommodate a higher inlet airstream water vapor contents than prior systems. This allows the present invention to eliminate the refrigeration units used to force condensation as in prior sYstems, thereby reducing the size of the system. Advantageously, the ambiant air filtration element incorporates dual beds for the filtration of the ambient air prior to the the distillation process, to provide for the continuous regeneration of one of the beds, without system down time.

Another aspect of the invention is the incorporation of a rapid pressure swing adsorption (PSA) unit into a cryogenic distillation system, thereby accommodating both transportation vibrational stresses and pressure swings incurred during the purge cycle.

Another aspect of the invention is the use of a stream of waste gas to purge the PSA beds in connection with an automatic looping system to ensure that a continuous supply of purge air is provided to the regenerative beds. In normal operation, it is desirable to use a stream of waste gas produced by the cryogenic distillation process to purge the regenerative beds. However, during the production of high quantities of liquid oxygen or during start-up periods, the distillation process may produce an insufficient quantity of waste gas to ensure sufficient purging of the beds. Desirably, however, an automatic looping system is provided to redirect a portion of the air stream exiting the PSA into the purge air loop. Advantageously, once the required level of waste gas reaches a level sufficient to purge the regenerative beds, the looping of the PSA outlet is discontinued.

Another aspect of the invention is the use of a warm heat exchanger outside of the insulation layer and the use of a main heat exchanger enclosed within the insulation layer.

DETAILED DESCRIPTION OF THE DRAWINGS

FIG. 3 is a cut-away perspective of the air compressor.

FIG. 4 is a perspective of the oil cooler subassembly.

FIG. 5 is an exploded perspective of a heat exchanger.

FIG. 6 is a first embodiment of heat exchanger pathways.

FIG. 7 is a second embodiment of heat exchanger pathways.

FIG. 8 is a third embodiment of heat exchanger pathway.

DETAILED DESCRIPTION OF THE PREFERRED EMBODIMENT

Figure 1:
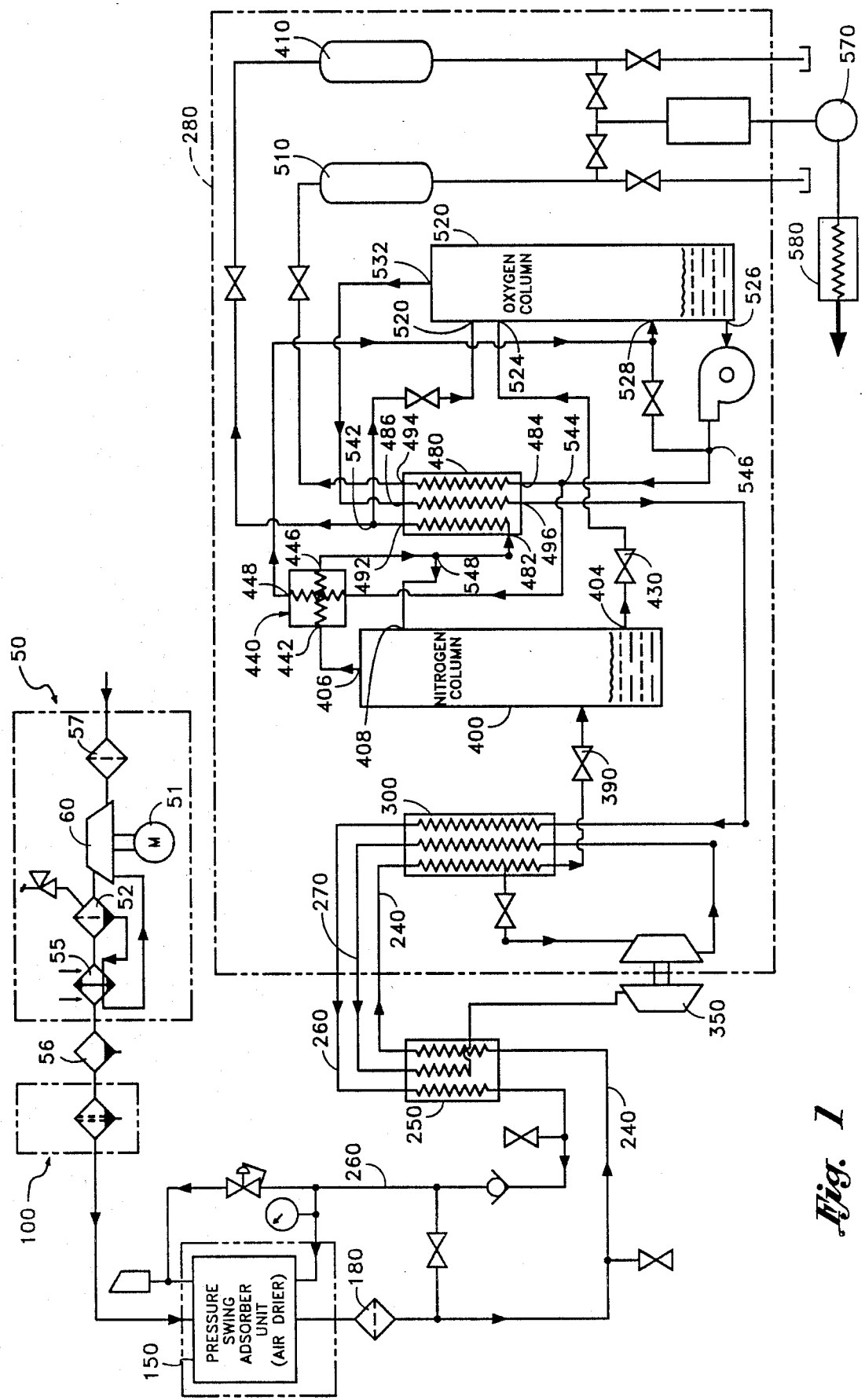
FIG. 1 is a schematic representation of the present invention.

Referring to FIG. 1, a schematic representation of an apparatus for producing high purity oxygen and nitrogen in a liquid or gaseous phase is shown. The plant is comprised of an air compressor assembly 50, a coalescer/HEPA filter 100, a pressure swing adsorber 150, a warm heat exchanger 250, a main heat exchanger 300, a turboexpander 350, a nitrogen column 400, a condenser 440, a subcooler 480 and an oxygen column 520.

Air Compressor

Figure 2:
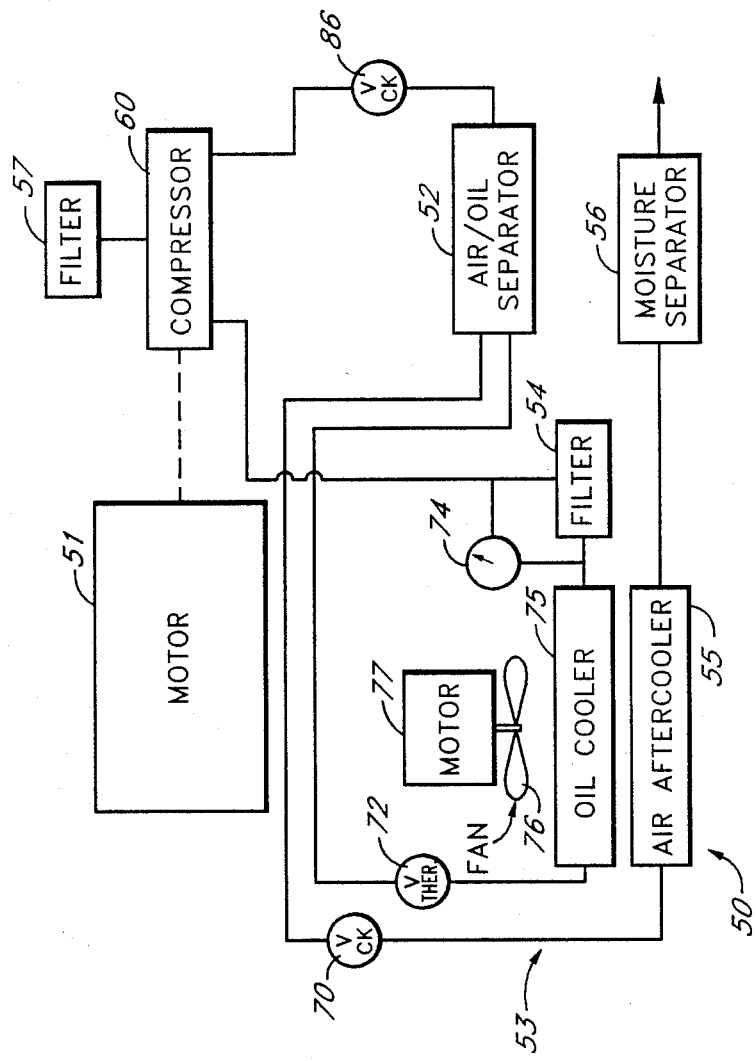
FIG. 2 is a schematic of the air compressor assembly and oil cooler subassembly.

As shown in FIG. 2, the air compressor assembly 50 includes a compressor motor 51, an air-oil separator 52, an air aftercooler 55, an air filter 57, an oil cooler assembly 53, a moisture seperator 56, and a compressor 60. Desirably, the air compressor assembly 50 is Model Number SZ 75 KW-SP, manufactured by the Air Compressor Group of the Ingersoll-Rand Company.

Referring to FIG. 3, the compressor 60 is a single stage, oil immersed, rotary lobe, screw-type compressor. The compressor 60 is directly driven through an integral gear box by the electric motor 51. The compressor 60 is a two rotor, positive displacement rotary unit which compresses the air between an intermeshing primary rotor 62 and a secondary rotor 64. The primary rotor 62 includes helically inclined lobe 63. The secondary rotor 64 includes a helically inclined groove 65. The helical lobe 63 of the primary rotor 62 is received within the helical groove 65 of the secondary rotor 64 to form a sealing engagement. Compression of the air takes place as the engagement point of the lobe 63 and the groove 65 travels the length of the helix.

A shaft extends from the primary rotor 62 to engage the motor 51 through the gear box. The secondary rotor 64 is driven by its engagement with the main rotor 62. The oil immersion of the compressor 60 provides that the driving of the secondary rotor 64 is accomplished without metal contact of the primary rotor 62. A thin film of oil provides the interface and thereby the sealing surface between the primary rotor 62 and the secondary rotor 64.

The discharge end of the rotors 62, 64 are received in tapered roller bearings. The tapered bearings prevent axial displacement of the rotors 62, 64 toward the tapered bearings during operation of the compressor 60. The inlet end of the rotors 62, 64 are supported by free floating bearings. The retention of the inlet end of the rotors 62, 64 in the free floating bearings allows for thermal expansion of the rotors during operation of the compressor 60. The helical engagement of the rotors 62, 64 generates a force tending to force the rotors toward the tapered bearings. The tapered bearings prevent this displacement while the floating bearings allow for thermal expansion of the rotors.

The rotors 62, 64 and the tapered and free floating bearings are contained within a housing 80. The housing 80 includes an air inlet port 82 located at the top of the housing 80 at the end proximal to the drive shaft and an air outlet port 84 located proximal to the tapered bearings. An air inlet check valve provides for the monodirectional flow of ambient air into the inlet port 82, while preventing a reverse flow of air through the inlet port 82. Prior to entering the air inlet port 82, the ambient air passes through the intake air filter 57. The air filter 57 is a dual stage, dry-type filter equipped with a cyclone-type pre-cleaner for heavy duty service in dusty conditions. The air filter 57 is designed to remove particulate matter of 10 microns or larger, with an efficiency of 94%.

Operation of the Air Compressor

Ambient air is drawn through the filter 57 and into the compressor 60 through the air inlet port 82. The air is drawn into the space preceding the sealing engagement of the lobe 63 within the groove 65. As rotation of the rotors 62, 64 causes the contact point of lobe 63 and the groove 65 to progress past the inlet port 82, the ambient air is trapped between the rotors and the wall of the housing 80. Continued rotor rotation causes the air to travel down the groove 65, thereby becoming compressed. Oil is injected into the housing 80 during compression of the air to adsorb the heat of compression, lubricate the rotors 62, 64 and fluidly seal the contact between the rotors 62, 64 and the housing 80.

Continued rotation of the rotors 62, 64 further reduces the volume of the trapped air, thereby generating more heat. The continued rotation displaces the compressed air towards the air outlet port 84. As the sealing contact between the lobe 63 and the groove 65 passes the outlet port 84, the compressed air and oil mixture are released through the port 84.

Referring to FIGS. 2 and 4, the air-oil mixture flows through an outlet pipe 85 and a check valve 86. The valve 86 prevents a return flow of the air-oil mixture into the compressor 60. After passing through the check valve 86, the air-oil mixture flows into the air-oil separator 52. The lower portion of the separator 52 includes a series of orthagonal baffles. The 90° path changes within the baffles cause a substantial separation of the air and oil. The compressed airstream then travels upward through horizontal elements which remove the remaining oil to approximately 2 to 3 parts per million (ppm).

The separated oil is then passed from the bottom of the separator 52 through an oil cooler assembly 53. The oil cooler assembly 53 includes a core 75, an oil filter 54, a thermostatic mixing valve 72, oil radiator 75 and an oil filter pressure gauge 74. The oil cooler assembly functions so that upon subsequent injection of the oil into the compressor 60, the oil temperature is between 130°–160° F. This temperature range prevents moisture condensation in the oil, while ensuring there is no chemical breakdown of the oil. An oil temperature within the desired range is maintained by the thermostatic mixing valve 72. The valve 72 determines the amount of oil to be passed through the oil cooler, so that the desired oil temperature is maintained.

As the separated oil flows through the oil cooler 75, the cooling motor 77 causes the fan 76 to force air across the oil cooler 75, thereby cooling the oil. The cooled oil then passes through the thermostatic valve 72.

The separated oil is then filtered through the oil filter 54 to remove any particulate matter which may have entered the system entrained in the ambient air. The filtering of the separated oil removes the suspended particulate matter which, if retained in the oil, could damage the rotors 62, 64 upon recirculation.

The oil filter 54 is a hydraulic-type full-flow filter with a single replaceable element. The filter 54, rated at 10 microns, is disposed downstream of the oil cooler assembly 53 and the thermostatic control valve 72. An oil filter pressure gauge 74 measurers the oil pressure differential across the filter 54 A 15 psi differential across a 10 micron rated filter indicates the limit of the filter efficiency, thereby indicating a replacement of the filter 54 is necessary.

As shown in FIGS. 1 and 2, the compressed air, at approximately 150 psig, then passes from the separator 52 to the aftercooler 55. The aftercooler 55 is an air cooled heat exchanger which reduces the temperature of the compressed air. This reduction in temperature causes a substantial portion of the water vapor within the air to condense. The condensate is removed through a moisture separator 56.

Coalescing/HEPA Filter

As the airstream leaves the moisture separator 56, the air has a relative humidity of approximately 75%. Referring to FIG. 1, the airstream then passes into a coalescing filter 100, such as Pall Coalescing HEPA-grade filter Model Number PC535001G24, manufactured by Pneumatic Products Corporation, a Division of Pall Safety Atmospheres, Inc. The filter 100 is a high area, pleated cartridge encased within an outer cylinder. The cylinder is non-woven fluorocarbon media. The air flow within the filter 100 is directed radially outward from the inside. The tortuosity and controlled pore size of the cylinder traps fine aerosols by impingement and blocking. The particles subsequently evaporate and pass downstream as a gas or agglomerate and drain by gravity to a sump. The media of the cylinder is hydrophobic and oleophobic treated to reduce pressure drop to approximately 2 psig under saturated airstream conditions.

The airstream, now free of entrained liquid, passes through the outer HEPA-grade media. The media is capable of removing 99.997% of 3 micron mean particulate diameter matter and 99.999% of particulate matter in the 0.6 to 1.7 micron size. The airstream then exits the filter 100 and passes to the pressure swing adsorber 150.

Pressure Swing Adsorber

The system design ensures the filtration of aerosols prior to the airstream entering the pressure swing adsorber 150. Aerosols can penetrate the packed beds of the pressure swing adsorber 150 and adversely effect the useful life and efficiency of the pressure swing adsorber.

The pressure swing adsorber 150 is a molecular sieve bed having immobilized beads of 13X type molecular sieve manufactured by Pall Safety Atmospheres, Inc. The molecular sieve-type beads of the adsorber 150 are coated and bonded (immobilized) by a proprietary process owned by Pall Safety Atmospheres, Inc. The adsorber functions to remove chemical impurities, water and carbon dioxide vapor to less than 1 ppm. In addition, the pressure swing adsorber 150 removes common pollutants found in the atmosphere, such as carbon monoxide, methane, ethane, nitrous oxides and oil vapors.

Figure 3A:
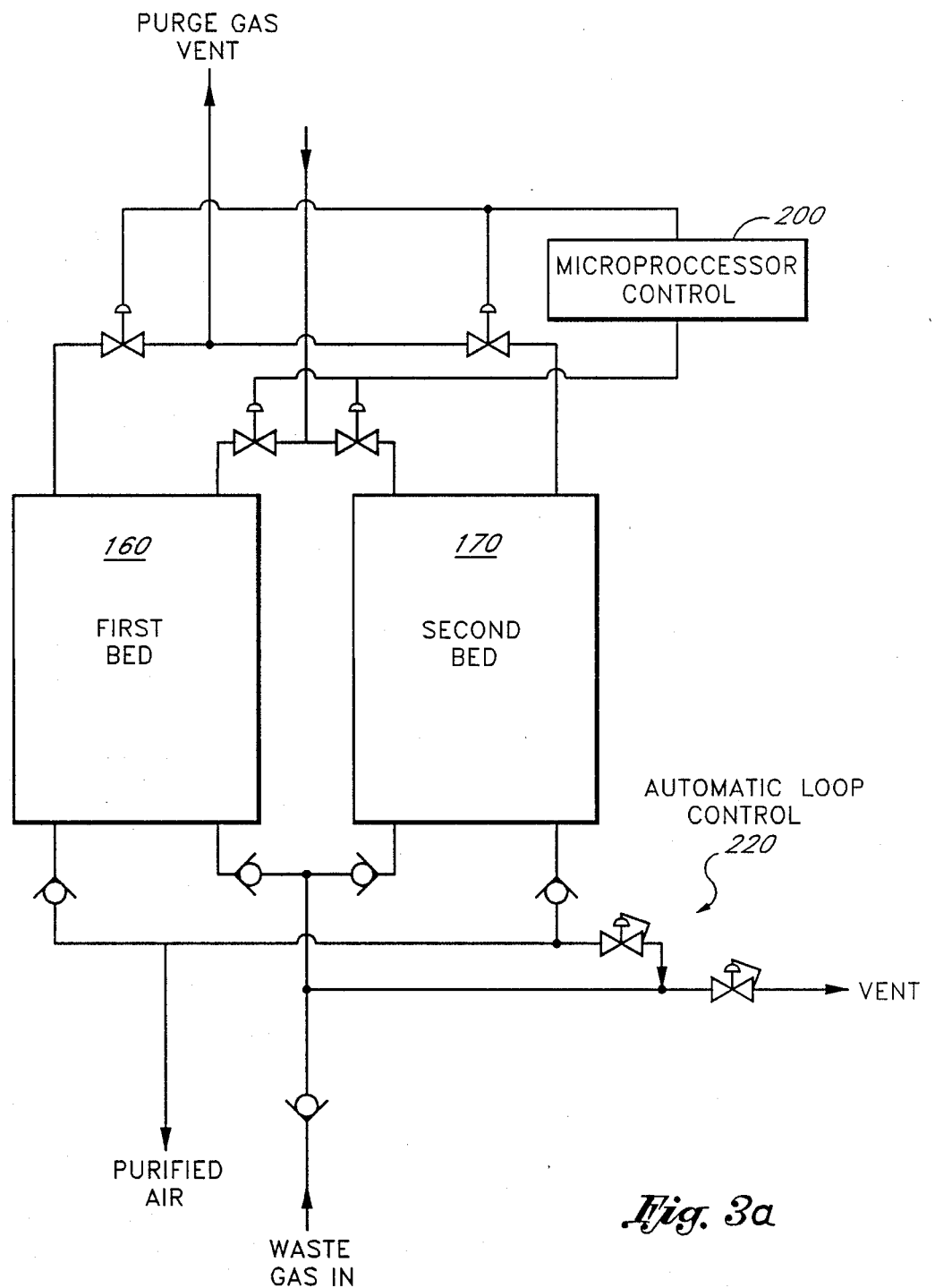
FIG. 3a is a schematic of a pressure swing adsorber.

As shown in FIG. 3, the pressure swing adsorber 150 of the present invention employs a dual bed packed system which allows for continuous regeneration. The adsorber 150 includes two immobilized molecular sieve-type, bonded regenerable packed cylindrical beds 160 and 170. Referring to FIG. 3a, the pressure swing adsorber 150 includes a microprocessor control 200 based control similar to those found in temperature swing adsorption units to direct inlet air flow to one of the beds 160, 170. The microprocessor control 200 cycles between the off-line purge and on-line process status of the beds in 30 to 60 second cycles. Therefore, as one bed is on-line processing the inlet airstream, the second bed is off-line being purged and regenerated. The concurrent regeneration of the off-line bed is accomplished through a flow of waste gas from the distillation process, as discussed infra. The regeneration of the off-line bed allows the present invention to operate continuously without shut down during periods of bed regeneration. In addition to removing the necessity of a refrigeration unit and a heated purge air unit, the pressure swing adsorber 150 provides dried, purified air for the distillation process, thereby allowing the present invention to employ a simple, modular cryogenic distillation process of a reduced size and complexity.

As shown in FIG. 3a, the pressure swing adsorber 150 also includes an automatic loop control 220 which functions to ensure that a sufficient quantity of purge gas is available purge the off-line bed. Under normal operating conditions the automatic loop control 220 uses the waste gas produced in the cryogenic distillation process. However, during startup conditions and the production of large quantities of liquid oxygyen, the automatic loop control 220 employs a portion of the airstream exiting the on-line bed to purge the off-line bed. When the cryogenic distillation process yields sufficient waste gas to purge the off-line bed, the automatic loop control 220 directs the airstream from the on-line bed to the distillation process.

Warm Heat Exchanger

Referring to FIG. 1, the dried, purified inlet airstream, exits the adsorber and passes through a filter 180 which removes any particular matter produced by the pressure swing adsorber 150. The inlet airstream then passes through a conduit 240 and passes into a warm heat exchanger 250. The heat exchanger 250 provides for the conductive and radiative heat transfer between the inlet airstream, the waste gas flow and the turboexpander exhaust. The inlet airstream is cooled from its temperature of approximately 15° F. above ambient air temperature to approximately 50° F. as the airstream exits the warm heat exchanger 250.

The warm heat exchanger 250, the main heat exchanger 300, the subcooler 480 and the condenser 440 are brazed aluminum plate-fin type heat exchangers as well known in the art. Referring to FIG. 5, the heat exchange surfaces are obtained by stacking alternate layers of corrugated fins 310 between flat aluminum separator plates 320. The plates 320 provide the primary heat exchanging surfaces of the heat exchanger. Therefore, the thickness of the plates 320 may be varied to accommodate the designed operating pressure. The fins 310, being disposed between the plates 320, provide the secondary heat exchanging surface. The fins 310 may be of a quantity, shape, spacing and size to accommodate the desired design operating pressure, heat exchange rates, pressure drop, fluid properties and fluid flow rate. A given configuration of the fin 310 disposed between the two separator plates 320 is fluidly sealed at the edges by solid aluminum side bars 330. A vertical configuration of layered plates 320, fins 310 and side bars 330 is bonded together by a brazing process to yield an integral rigid structure having a series of flow passages.

As shown in FIGS. 6–8, the passages defined by the fins 310, plates 320 and side bars 330 define adjacent layers which may exhibit perpendicular flow paths, parallel flow paths or a combination thereof, as determined by the number of flows through the heat exchanger.

In the preferred embodiment, the warm heat exchanger 250 is of a rectangular configuration having a length of approximately 58 inches, a width of approximately 17 inches and a depth of approximately 4.2 inches.

As the airstream exits the warm heat exchanger 250, the airstream passes through an insulating layer which forms a cold box 280 surrounding the cryogenic distillation encloses the main heat exchanger 300, the condenser 440, the nitrogen column 400, the oxygen column 520 and the subcooler 480 within the insulating layer, thereby forming an area which may be preferably packed with Perlite. By precooling the inlet airstream through the warm heat exchanger 250, the main heat exchanger 300, disposed within the cold box 280, may be of a reduced size. The size reduction of the main heat exchanger 300 permits the cold box to also be of a reduced size.

Main Heat Exchanger

The main heat exchanger 300 is of a similar construction to the warm heat exchanger, as discussion infra. The main heat exchanger 300 of the preferred embodiment is approximately 79 inches high, 11 inches wide and 8 inches deep. The main heat exchanger 300 provides for the conductive and radiative heat transfer between the inlet airstream, the waste gas flow and the turboexpander discharge. The inlet air is cooled to cryogenic temperatures in the main heat exchanger 300, partially liquefying the inlet airstream.

Turboexpander

Figure 9:
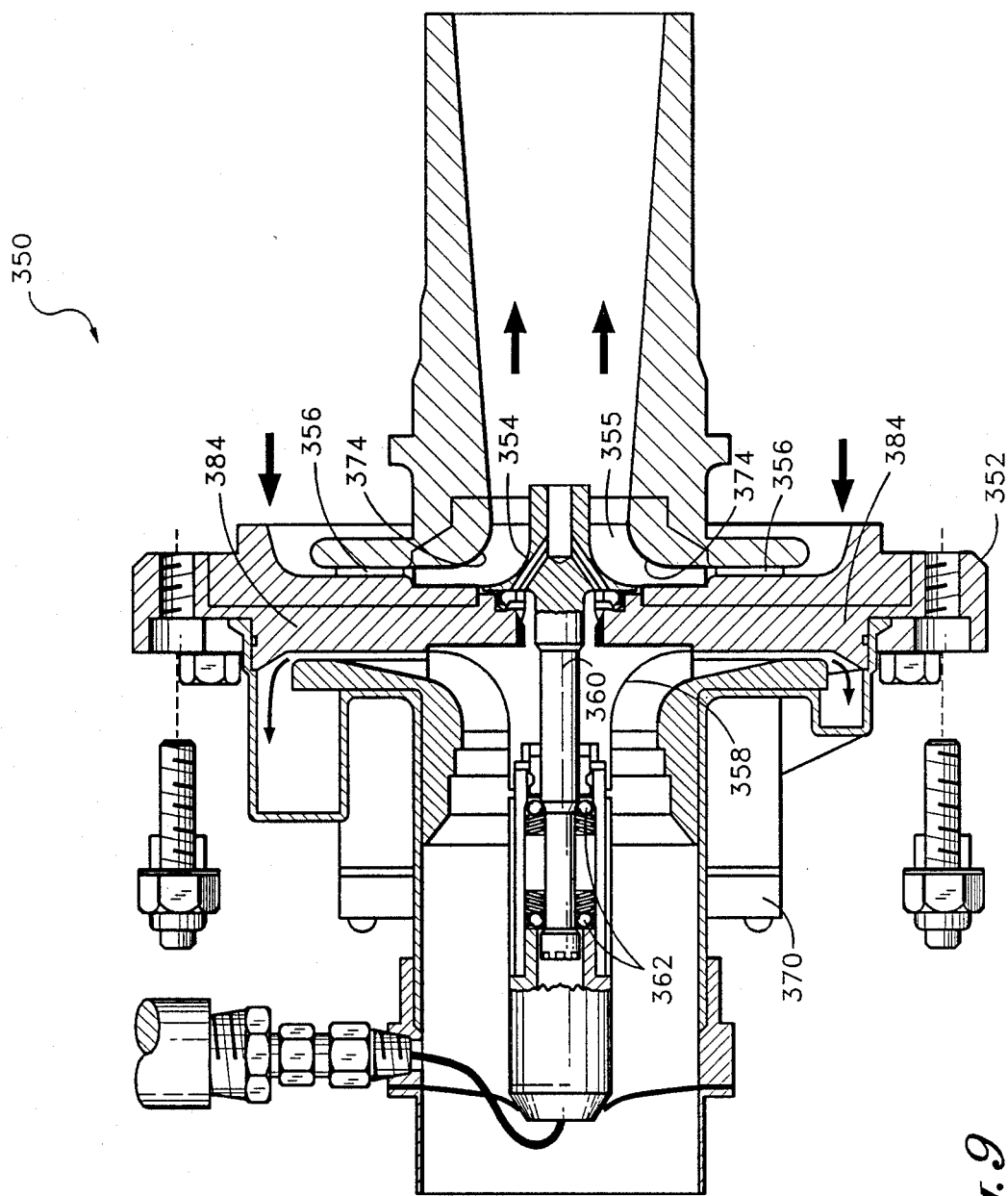
FIG. 9 is a cross-sectional view of the turboexpander.
Figure 10:
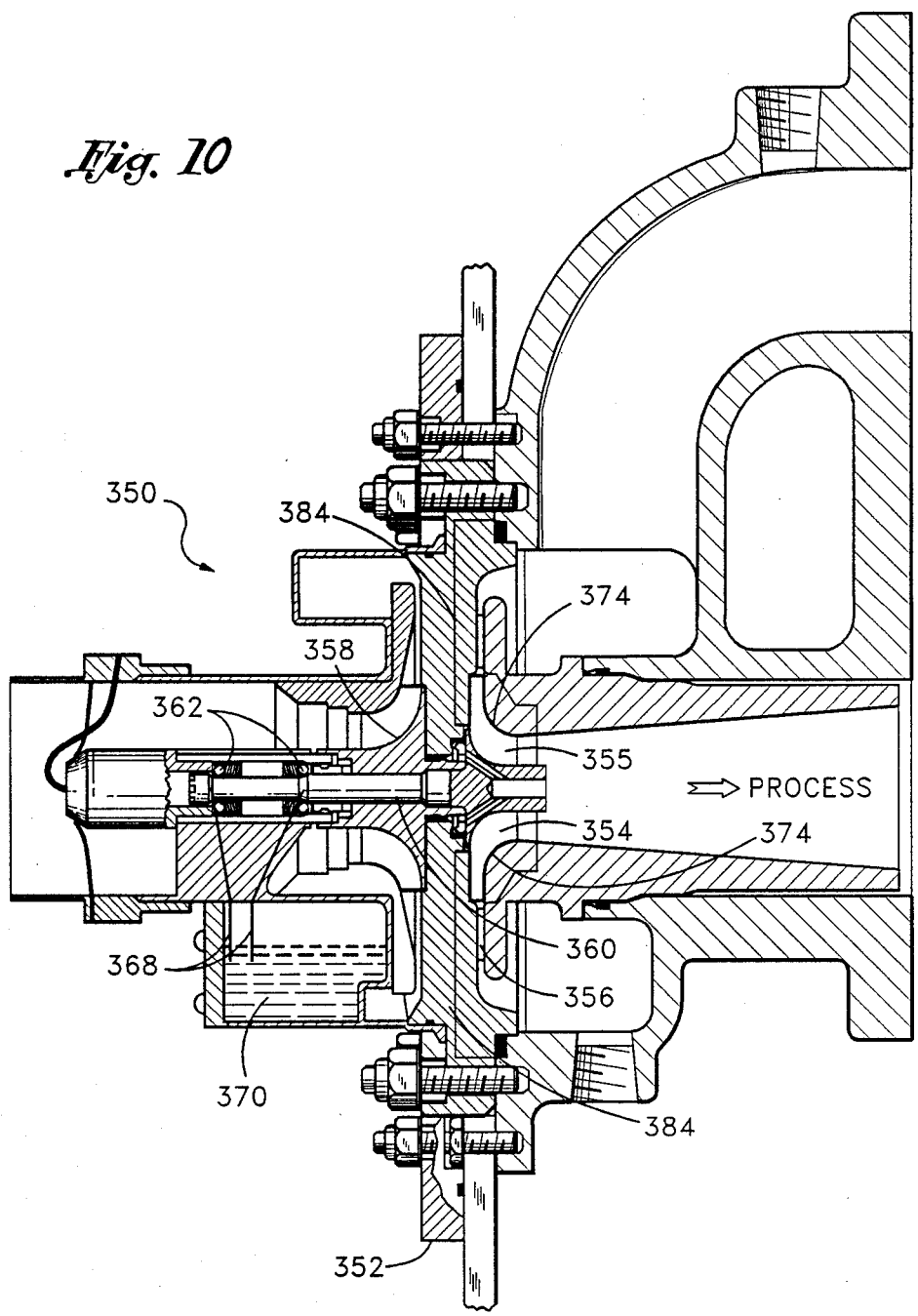
FIG. 10 is a cross-sectional view of the turboexpander including inlet pathways.

Prior to the inlet airstream exiting the main heat exchanger 300, approximately 75% of the inlet airstream is diverted through the turboexpander 350. The basic turboexpander is manufactured by Aerodyne Dallas as Model No. 9300. However, as shown in FIGS. 9 and 10, the unit is modified to include a fiberglass based, with stainless steel reenforced thermal barrier 384 between a turbine wheel 354 and a compressor wheel 358. In addition, the turboexpander is also modified to incorporate a fiberglass rim 374 disposed proximal to a turbine wheel 354. The turboexpander 350 is an energy removal device which provides the primary means of refrigeration in the main heat exchanger 300.

Referring to FIG. 9, the turboexpander 350 includes a housing 352 which supports the turbine wheel 354. The turbine wheel 354 includes a plurality of radially extending vanes 355. The housing 352 also contains a nozzle ring 356 which directs the airstream against the vanes 355. A compressor wheel 358 is directly coupled to the turbine wheel 354 by a shaft 360. The shaft 360 is a cantilever design supported by the bearings 362 which are disposed on the warm side of the turboexpander 350, proximal to the compressor wheel 358.

Under design operating conditions the shaft 360 exhibits a deflection of less than 0.001 inches. To accommodate any excess deflection of the shaft 360, the housing 352 includes a fiberglass funnel rim 374 disposed proximal to the turbine vanes 355. Upon excess deflection of the shaft 360 and hence blades 355, the blades 355 engage and abrade the fiberglass rim 374. Since the blades 355 engage the fiberglass rim 374 rather than a metal surface, the turboexpander blades 355 are capable of contacting the rim under abnormal shaft deflection without destroying the turbine wheel 354.

Lubrication of the bearings 362 is accomplished through a passive lubrication system. The cantilever design of the shaft 360 permits the bearings 362 to be disposed on the compressor side of the turboexpander 350, away from the turbine wheel 354. In addition to exposing the bearings to non-cryogenic temperatures, the positioning of the bearings 362 prevents oil from entering the process flow system as the flow passes through the turbine wheel 354. The oil lubrication system 366, including the wick 368 and reservoir 370, is a passive system employing the capillary action of the oil to generate an oil flow from the reservoir 370 through the wick 368. The lubrication system 366 therefore does not require either a pressurized oil feed or a buffer of inert gas on the seals to preVent oil from entering the process air stream.

Because the bearings 362 of the turboexpander 350 are disposed outside of the expanded and supercooled airstream the bearings 362 are therefore exposed to substantially ambient air temperatures. Because the bearings 362 do not operate under cryogenic temperatures, the bearings are housed in a reliable passive lubrication system 366 providing an increased operating life.

Operation of the Turboexpander

Referring to FIGS. 9 and 10, pressurized air from the inlet airstream enters the turboexpander 350 and is directed by the nozzle ring 356 to impinge upon the turbine vanes 355. The force of the airstream on the turbine vanes 355 causes the turbine wheel 354 to rotate. The airstream then travels radially inward toward the center of the rotating wheel 354 where the airstream further expands and is redirected in a 90° direction change. As the air travels inward, it expands from its inlet pressure of approximately 150 psig. As the exhaust airstream exits the turboexpander 354, the airstream exhibits a pressure of approximately 2 psig. The expansion of the air from approximately 150 psig to 2 psig creates a cryogenic air flow which is employed to cool the remaining process stream in the main heat exchanger 300.

The cool, expanded turboexpander exhaust airstream exits the turboexpander 350 at approximately −296° F. The exhaust airstream is then passed through the main heat exchanger 300. The exhaust airstream then passes through the warm heat exchanger 250, where it precools the inlet airstream.

The work done by the expanding air on the turbine wheel 354 causes the compression wheel 358 to rotate. The exhaust airstream is drawn from the warm heat exchanger 250 into the vacuum generated by the compressor wheel 358. The compression of the exhaust airstream provides resistance to the turbine wheel 354, so that the rotational speed of the turbine wheel 354 and hence expansion of the inlet airstream and its temperature may be controlled.

The design of the turboexpander 354 prevents the exhaust airstream which is being compressed by the compressor wheel 358, from entering and thereby contaminating the expanding inlet airstream. The higher pressure of the expanding inlet airstream interfaces with the compressing exhaust airstream, thereby creating a pressure barrier which prevents the exhaust gas from contaminating the expanding inlet airstream.

Referring to FIG. 1, the remaining 25% of inlet airstream in the main heat exchanger 300, having been cooled by the turboexpander exhaust airstream and the waste approximately 150 psig and −265° F. The low temperature of the pressurized inlet airstream creates partial condensation of the airstream.

Nitrogen Column

As shown in FIG. 1, the inlet airstream then passes through an air inlet expansion valve 390. The valve 390 permits a reduction of the inlet airstream pressure to approximately 85 psia, which results in a reduction of the temperature to approximately −280° F. The passage of the inlet stream through the expansion valve 390 causes more condensate to form as the inlet airstream then enters the nitrogen column 400.

Figure 11:
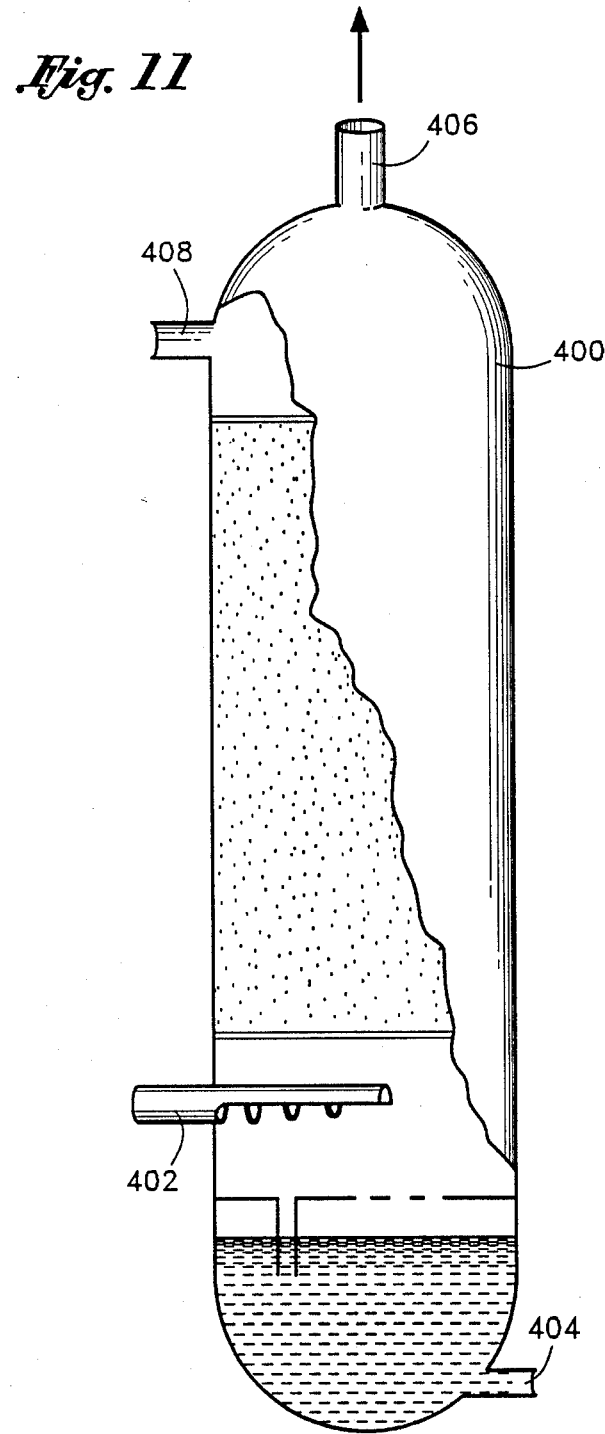
FIG. 11 is a cut-away side elevation of a nitrogen distillation column.

Referring to FIG. 11, the nitrogen column 400 and the oxygen column 520 are distillation columns having a cylindrical configuration disposed in a vertical orientation. The columns 400, 520 are packed with 0.24 Pro-Pak inch Protruded Metal Distillation Packing manufactured by Scientific Development Company of State College, Pa. The packing provides a wetting surface upon which the condensate may accumulate and provide an increased exposure time to vapor within the column.

The nitrogen column 400 of the preferred embodiment has a cylindrical configuration with a height of approximately 60 inches and a diameter of approximately 7 inches. The nitrogen column 400 includes an inlet port 402 approximately 12.5 inches from the bottom of the column 400, a liquid oxygen port 404 approximately 3.5 inches from the bottom of the column 400, a vapor discharge port 406 located at the top of the column 400, and a reflux inlet 408 approximately 6 inches from the top of the column 400.

Operation of the Nitrogen Column

The inlet airstream entering the nitrogen column 400 through the inlet port 402 at approximately 85 psia and −280° F. and includes an oxygen-rich condensate. The condensate collects in the bottom of the nitrogen column 400 and is subsequently transferred to the oxygen column 520 as feed stock. The vapor entering the nitrogen column 400 has a low oxygen content and rises to the top of the column 400 through the packing. At the vapor rises through the packing to the top of the column 400, the vapor passes through the packing and releases oxygen to the liquid on the packing, as the liquid of the packing releases nitrogen to the vapor. Likewise, as the liquid falls, it releases nitrogen to the vapor, as the vapor releases oxygen to the liquid. The vapor thereby increases in nitrogen concentration as the condensate increases in oxygen concentration. The vapor at the top of the column 400 is of 99.5% purity at a pressure of approximately 85 psia at a temperature of approximately −287° F. The oxygen condensate at the bottom of the column 400 is at a pressure of approximately 85.5 psia at approximately −280° F. The oxygen-rich condensate passes to the oxygen column 520 as a feed stock.

Oxygen Column

Figure 12:
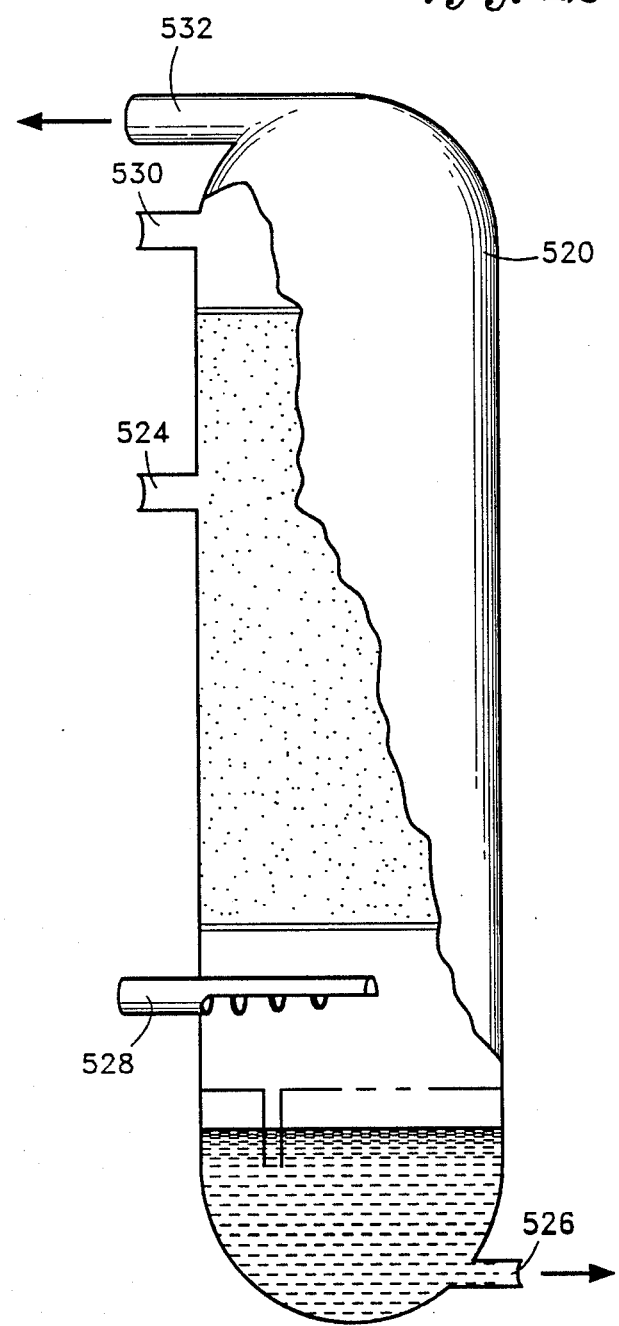
FIG. 12 is a cut-away side elevation of an oxygen distillation column.

Referring to FIG. 12, the oxygen column 520 is a packed distillation column similar to the nitrogen column 400. The oxygen column is packed with 0.24 inch Pro-Pak Protruded Metal Distillation Packing manufactured by Scientific Development Company. In the preferred embodiment, the oxygen column 520 is a vertically oriented cylinder approximately 75 inches high having a diameter of approximately 8.5 inches. The oxygen column 520 includes a condensate inlet port 524 approximately 19 inches from the top of the column 520, a liquid oxygen discharge port 526 approximately 2.7 inches from the bottom of the column 520, a two phase inlet port 528 approximately 9.5 inches from the bottom of the column 520, a reflux inlet port 530 approximately 5 inches below the top of the column 520, and a waste gas outlet port 532 at the top of the oxygen column 520.

Operation of the Oxygen Column

The oxygen rich condensate from the bottom of the nitrogen column 400 exits through the liquid oxygen port 404 and passes through an expansion valve 430. The expansion valve 430 causes the pressure to drop from approximately 85 psia to approximately 21.7 psia. This further expansion results in a lowering of the condensate temperature to approximately −308° F. The condensate then enters the oxygen column 520 through the condensate inlet port 524. As the condensate enters the column 520, it begins to descend through the column packing. As the condensate descends, the condensate saturates the packing and releases nitrogen to the vapor rising through the packing. Likewise, as the vapor rises, it releases oxygen to the condensate, as the condensate releases nitrogen to the vapor. The vapor rises up through the column 520 and is discharged through the waste gas outlet port 532. The waste gas exiting through the waste gas outlet port 532 has a pressure of approximately 21.7 psia, a temperature of approximately −316° F. and is substantially comprised of nitrogen.

As the nitrogen evaporates from the descending condensate, the condensate becomes a higher purity of oxygen. When the condensate has descended through the packing to the bottom of the oxygen column 520, any remaining nitrogen has evaporated, thereby leaving liquid oxygen of 99.5% purity in the bottom of the column 520. The liquid oxygen at the bottom of the column 520 has a pressure of approximately 22.3 psia and a temperature of approximately −291° F.

The liquid oxygen may be withdrawn from the bottom of the oxygen column 520 through the liquid oxygen port 526 by a circulation pump 540. The pump 540 is an air operated, magnetically coupled unit. The drive motor and the impeller shaft are effectively decoupled by the encasement of the impeller shaft in a separate casing, thereby reducing the risk of explosions. Liquid oxygen withdrawn by the pump 540 may be directed toward the subcooler 480 and the condenser 440, or solely to the condenser. If the liquid oxygen is directed to the condenser 440, the flow bypasses the subcooler 480 and flows directly to the condenser 440.

Condenser

Referring to FIG. 1, the condenser 440 is a constant temperature and constant pressure heat exchanger well known in the art. The configuration of the condenser 440 is similar to the main heat exchanger 300, the warm heat exchanger 250, and the subcooler 480. The condenser 440 permits the radiative and conductive heat transfer between the liquid oxygen and the nitrogen vapor from the nitrogen column 400.

In the preferred embodiment, the condenser 440 is of a substantially rectangular configuration approximately 11.8 inches high, 9.2 inches wide and 20.8 inches long. The condenser includes a nitrogen vapor inlet 442, a liquid oxygen inlet 444, a liquid nitrogen outlet 446, and a two phase oxygen outlet 448.

Operation of the Condenser

As stated supra, the condenser 440 provides a constant temperature constant pressure conductive and radiative heat transfer between the nitrogen vapor from the nitrogen column 400 and liquid oxygen. The nitrogen vapor enters the condenser 440 through the nitrogen vapor inlet 442 at approximately 85 psia and $-287°$ F. The liquid oxygen enters the condenser 440 through the liquid oxygen inlet 444 at approximately 22.3 psia and $-291°$ F. The nitrogen vapor is thermally exposed to the colder liquid oxygen, thereby causing the nitrogen to condense, forming liquid nitrogen. The heat of condensation from the condensing nitrogen causes some of the liquid oxygen to vaporize thereby creating a two-phase oxygen mixture.

Usage of Liquid Nitrogen

The liquid nitrogen exits the condenser 440 through the liquid nitrogen outlet 446 and passes to a valve 548 which directs the liquid nitrogen to either the subcooler 480 or the nitrogen column 400. By means of a valve 548, the liquid nitrogen from the condenser 440 may be returned to the nitrogen column 400 through the regeneration port 408 and additionally may pass through the subcooler 480 to be collected in a storage tank 410 or be redistilled through the oxygen column 520.

Liquid nitrogen which is returned to the nitrogen column 400, through the regeneration port 408 acts as a cold cap and reflux for the calcium 400. The liquid nitrogen entering the nitrogen column 400 through the regeneration port 408 has a pressure of approximately 84.9 psia be at approximately $-287°$ F. As the liquid nitrogen descends through the packing nitrogen column 400, the nitrogen evaporates and cools the column. Selective introduction of the liquid nitrogen into the nitrogen column 400 allows for thermal control of the column and hence production of liquid nitrogen.

Additionally, the valve 548 may direct the liquid nitrogen through the subcooler 480 after which it may be directed to either the storage tank 410 or the oxygen column 520 by means of a valve 542. The liquid nitrogen directed to the oxygen column 520 enters the column 520 through a regeneration inlet 530 at approximately 21.7 psia and approximately $-315°$ F. The flow of liquid nitrogen into the oxygen column 520 serves to control the oxygen purity and column pressure during the production of liquid oxygen. As the liquid nitrogen enters the oxygen column 520 the liquid descends through the packing. The evaporating nitrogen serves to cool the oxygen column 520 thereby regulating the production of liquid oxygen.

Subcooler

Referring to FIG. 1, upon direction of the liquid nitrogen to the subcooler 480 through the valve 548, the liquid nitrogen is exposed to radiative and conductive heat transfer with the waste gas and liquid oxygen flow streams.

The subcooler 480 is of the same design as the main heat exchanger 300, the warm heat exchanger 250, and the condenser 440 described supra. In the preferred embodiment, the subcooler is of an elongated rectangular configuration approximately 50.2 inches high, 3.5 inches deep and 4.5 inches wide. Disposed proximal to the bottom of the subcooler 480 is a liquid nitrogen inlet 482, a liquid oxygen inlet 484, and a waste gas outlet 496. Disposed proximal to the top of the subcooler 480 is a waste gas inlet 486, a liquid nitrogen outlet 492, and a liquid oxygen outlet 494.

Because the storage tanks 410, 510 are desirably at a lower pressure than the corresponding column 400, 520, the liquid oxygen and nitrogen must be subcooled to remain in a liquid phase. The subcooler 480 thereby subcools the liquid oxygen and liquid nitrogen below their condensing temperatures, which allows for transfer of the fluids to storage tanks without incurring vaporization of the liquid oxygen and nitrogen.

Operation of the Subcooler

Waste gas exiting the oxygen column 520 through the port 532, and passes into the subcooler 480 through the waste gas inlet port 486. The waste gas vapor enters the subcooler 480 at approximately 21.7 , psia and approximately $-316°$ F. The waste gas vapor cools the liquid oxygen and liquid nitrogen streams to a temperature below their respective boiling temperatures. Supercooling of the liquid oxygen and liquid nitrogen streams is necessary to ensure that upon passing from the subcooler 480 to the respective storage tanks 510, 410 no vaporization of the liquid streams occurs.

Use of Waste Gas to Regenerate Beds

The waste gas exits the subcooler 480 through the waste gas outlet 496 and passes through the main heat exchanger 300, the warm heat exchanger 250, and finally to the pressure swing adsorber 150. The waste gas is used to purge and regenerate the beds 160, 170 of the adsorber 150. Specifically, the microprocessor control 200 alternates the flow of inlet air from one bed to another in cycles of 30-60 seconds. As the inlet air has a pressure of approximately 150 psig, the pressure within the on-line bed is also approximately 150 psig. When the bed is switched off-line by the microprocessor control 200, the bed is rapidly decompressed to approximately 3-7 psig through the release of pressure through the upsteam end of the bed. Waste gas is then allowed to flow from the downstream end of the bed to the uptream end of the bed to purge the bed.

Although this flow of waste gas from the oxygen column 520 is typically sufficient to purge the beds 160, 170 during normal operation, during the production of high quantities of liquid oxygen or during start-up periods, the distillation process may produce an insufficient quantity of waste nitrogen to ensure sufficient purging of the beds. Desirably, however, the automatic loop control 220 is provided to redirect a portion of the air stream exiting the PSA into the purge air loop, thereby creating an automatic looping system. Once the flow of waste gas reaches a level sufficient to purge the regenerative beds, the looping of the air stream to the PSA outlet is discontinued.

Production of Gaseous Oxygen and Nitrogen

The present invention produces gaseous oxygen and nitrogen through the vaporization of the liquid oxygen and nitrogen. Referring to FIG. 1, the liquid product is withdrawn from the respective storage container 410, 510, and passed through a pump 570. As the liquid discharges from the pump 570, the liquid is warmed by an electric vaporizer 580 which vaporizes the liquid to produce the gaseous phase of oxygen or nitrogen, wherein the produced gases have the same 99.5% purity as the liquid phase.

We claim:

1. A system for manufacturing liquid oxygen and liquid nitrogen from ambient air, comprising:
    an air compressor assembly including an inlet port and an outlet port, said assembly drawing ambient air containing oxygen and nitrogen through said inlet port and compressing said ambient air into a stream of compressed air and forcing said air stream through said outlet port;
    a HEPA-grade filter through which said air stream passes for removing particulate matter from said compressed air stream;
    a pressure swing adsorber having a first molecular sieve bed through which said air stream can pass after passing through said HEPA-grade filter for removing chemical impurities, water and carbon dioxide vapor from said compressed air stream;
    a first heat exchanger through which said air stream passes after passing through said first molecular sieve bed, said first heat exchanger cooling said air stream to lower the temperature of said air stream to a level where said air stream begins to partially condense;
    a turboexpander through which a portion of said air stream passes after passing through said first heat exchanger, said turboexpander cooling said portion of said air stream to lower than −275° F. and directing said cooled portion of said air stream back through said first heat exchanger to cool said heat exchanger;
    an first expansion valve through which another portion of said air stream passes after passing through said first heat exchanger, said first expansion valve lowering the pressure of said another portion of said air stream to a temperature at which a substantial portion of the oxygen in said another portion of said air stream condenses;
    a nitrogen distillation column into which said another portion of said air stream passes after passing through said first expansion valve, said nitrogen column having a top and a bottom, said another portion of said air stream separating into condensate and vapor in said nitrogen column, said condensate falling toward the bottom of said nitrogen column and said vapor rising toward the top of said nitrogen column, wherein the portion of said vapor reaching said top of said nitrogen column contains over 95% pure nitrogen and said portion of said condensate reaching said bottom of said nitrogen column being oxygen rich;
    a second expansion valve through which said oxygen rich condensate from said bottom of said nitrogen column passes, said expansion valve cooling said oxygen rich condensate lower than −300° F.;
    an oxygen distillation column into which said condensate passes after passing through said second expansion valve, said oxygen column having a top and a bottom, said condensate separating into part vapor and part condensate in said oxygen column, said part coondensate falling toward the bottom of said oxygen column and said part vapor rising toward the top of said oxygen column, wherein said portion of said part condensate reaching said bottom of said oxygen column contains over 95% oxygen;
    a condenser through which said portion of said part condensate reaching said bottom of said oxygen column passes and through which said portion of said vapor reaching said top of said nitrogen column passes, said portion of said part condensate reaching said bottom of said oxygen column cooling said portion of said vapor reaching said top of said nitrogen column causing said portion of said vapor reaching said top of said nitrogen column to condense; and
    an insulating layer surrounding said first heat exchanger, said turboexpander, said nitrogen distillation column, said condenser and said oxygen distillation column.

2. The system of claim 1, further comprising a second heat exchanger opposite said insulating layer from said first heat exchanger, said air stream passing through said second heat exchanger after passing through said first bed and before passing through said first heat exchanger, said second heat exchanger cooling said air stream.

3. The system of claim 1, further comprising a second molecular sieve bed in said pressure swing adsorber through which said airstream can pass after passing through said HEPA-grade filter for removing chemical impurities, water and carbon dioxide vapor from said compressed airstream and a control for switching said airstream from said first molecular sieved bed to said second molecular sieved bed.

4. The system of claim 3, wherein a portion of said part vapor reaches said top of said oxygen column and is alternatively passed through said beds to regenerate said beds.

5. The system of claim 4, further comprising an automatic looping mechanism for redirecting a portion of the air stream from said seive beds back into the one of said sieve beds being regenerated to a provide sufficient volume of gas to regenerate said one of said beds.

6. The system of claim 1, further comprising:
    a subcooler through which said part vapor from said top of said oxygen column, said portion of said vapor reaching said top of said nitrogen column passing through said condensers and said portion of said part condensate reaching said bottom of said oxygen column passes, wherein said part vapor from said top of said oxygen column cools said portion of said vapor reaching said top of said nitrogen column passing through said condenser and said portion of said part condensate reaching said bottom of said oxygen column, wherein said subcooler is surrounded by said insulating layer.

7. A system for manufacturing liquid oxygen and liquid nitrogen from ambient air, comprising:
    an air compressor assembly including an inlet port and an outlet port, said assembly drawing ambient air containing oxygen and nitrogen through said inlet port and compressing said ambient air into a stream of compressed air and forcing said air stream through said outlet port;

a HEPA-grade filter through which said air stream passes for removing particulate matter from said compresses air stream;

a first molecular sieve bed through which said air stream can pass after passing through said HEPA-grade filter for removing chemical impurities, water and carbon dioxide vapor from said compressed air stream, wherein said molecular sieve bed has a regeneration cycle of less than five minutes;

a first heat exchanger through which said air stream passes after passing through said first molecular sieved bed, said first heat exchanger cooling said air stream to lower the temperature of said air stream to a level where said air stream begins to partially condense;

a turboexpander through which a portion of said air stream passes after passing through said first heat exchanger, said turboexpander cooling said portion of said air stream to lower than $-275°$ F. and directing said cooled portion of said air stream back through said first heat exchanger to cool said heat exchanger;

an first expansion valve through which another portion of said air stream passes after passing through said first heat exchanger, said first expansion valve lowering the pressure of said another portion of said air stream to a temperature at which a substantial portion of the oxygen in said another portion of said air stream condenses;

a nitrogen distillation column into which said another portion of said air stream passes after passing through said first expansion valve, said nitrogen column having a top and a bottom, said another portion of said air stream separating into condensate and vapor in said nitrogen column, said condensate following toward the bottom of said nitrogen column and said vapor rising toward the top of said nitrogen column, wherein the portion of said vapor reaching said top of said nitrogen column contains over 95% pure nitrogen and said portion of said condensate reaching said bottom of said nitrogen column being oxygen rich;

a second expansion valve through which said oxygen rich condensate from said bottom of said nitrogen column passes, said expansion valve cooling said oxygen rich condensate lower than $-300°$ F.;

an oxygen distillation column into which said condensate passes after passing through said second expansion valve, said oxygen column having a top and a bottom, said condensate separating into part vapor and part condensate in said oxygen column, said part condensate falling toward the bottom of said oxygen column and said part vapor rising toward the top of said oxygen column, wherein said portion of said part condensate reaching said bottom of said oxygen column contains over 95% oxygen;

a condenser through which said portion of said part condensate reaching said bottom of said oxygen column passes and through which said portion of said vapor reaching said top of said nitrogen column passes, said portion of said part condensate reaching said bottom of said oxygen column cooling said portion of said vapor reaching said top of said nitrogen column causing said portion of said vapor reaching said top of said nitrogen column to condense; and an insulating layer surrounding said first heat exchanger, said turboexpander, said nitrogen distillation column, said condenser and said oxygen distillation column.

8. The system of claim 7, wherein said first molecular sieve bed comprises a rapid pressure swing adsorption unit.

9. The system of claim 7, further comprising a second heat exchanger opposite said insulating layer from said first heat exchanger, said air stream passing through said second heat exchanger after passing through said first molecular sieved bed and before passing through said first heat exchanger, said second heat exchanger cooling said air stream.

* * * * *

UNITED STATES PATENT AND TRADEMARK OFFICE
CERTIFICATE OF CORRECTION

PATENT NO. : 4,957,523

DATED : September 18, 1990

INVENTOR(S) : Zarate et al.

It is certified that error appears in the above-identified patent and that said Letters Patent is hereby corrected as shown below:

In Column 1, at line 20, change "required support" to
    --required by hospitals for surgical operations and
    subsequesnt patient support--

In Column 2, at line 31, change "sYstems" to --systems--

In Column 7, at line 28, change "distillation encloses" to
    --distillation process. The cold box 280, formed by
    the insulating layer, encloses--

In Column 8, at line 32, change "preVent" to --prevent--

In Column 9, at line 16, change "waste approximately" to --
waste gas flow, exits the main heat exchanger 300 at
approximately--

In Column 9, at line 58, change "At" to --As--

In Column 11, at line 46, change "calcium" to --column--

Signed and Sealed this

Eighth Day of September, 1992

*Attest:*

DOUGLAS B. COMER

*Attesting Officer*  *Acting Commissioner of Patents and Trademarks*